United States Patent
Naor

(10) Patent No.: US 9,550,620 B2
(45) Date of Patent: Jan. 24, 2017

(54) DEVICES AND DISPENSERS FOR STERILE COVERINGS FOR TABLET COMPUTERS AND MOBILE PHONES

(76) Inventor: Isaac S. Naor, Marina Del Rey, CA (US)

(*) Notice: Subject to any disclaimer, the term of this patent is extended or adjusted under 35 U.S.C. 154(b) by 890 days.

(21) Appl. No.: 13/363,331

(22) Filed: Jan. 31, 2012

(65) Prior Publication Data

US 2013/0186798 A1 Jul. 25, 2013

Related U.S. Application Data

(63) Continuation of application No. 13/358,484, filed on Jan. 25, 2012, now abandoned.

(51) Int. Cl.
*B65D 85/84* (2006.01)
*B65D 83/08* (2006.01)

(52) U.S. Cl.
CPC .......... *B65D 83/08* (2013.01); *B65D 2313/02* (2013.01)

(58) Field of Classification Search
CPC .................... B65D 83/08; B65D 2313/02
USPC ........ 206/524.3, 320, 316.1, 524.2, 0.5, 363
See application file for complete search history.

(56) References Cited

U.S. PATENT DOCUMENTS

| | | | |
|---|---|---|---|
| 3,809,229 A | 5/1974 | Wahlig | |
| 5,812,188 A * | 9/1998 | Adair | 348/77 |
| 5,873,814 A | 2/1999 | Adair | |
| 5,944,432 A | 8/1999 | Richardson | |
| 2001/0041088 A1 | 11/2001 | Lebeau et al. | |
| 2003/0127345 A1* | 7/2003 | Zuleta et al. | 206/320 |
| 2004/0154941 A1* | 8/2004 | Montler | 206/320 |
| 2006/0124482 A1* | 6/2006 | Hodges | 206/320 |
| 2007/0016008 A1 | 1/2007 | Schoenefeld | |
| 2007/0166188 A1 | 7/2007 | Ryterski et al. | |
| 2009/0021476 A1 | 1/2009 | Steinle et al. | |
| 2009/0078707 A1* | 3/2009 | Chen | 220/592.01 |
| 2010/0053085 A1 | 3/2010 | Hall | |
| 2010/0096963 A1* | 4/2010 | McLaughlin et al. | 312/223.1 |
| 2011/0256019 A1 | 10/2011 | Gruen et al. | |
| 2012/0174373 A1* | 7/2012 | Whitney et al. | 29/428 |

OTHER PUBLICATIONS

Echo Medical, "Tablet Cover," 2012, p. 1, http://echomedical.com/cover/.

(Continued)

*Primary Examiner* — J. Gregory Pickett
*Assistant Examiner* — Rafael Ortiz
(74) *Attorney, Agent, or Firm* — Carr & Ferrell LLP

(57) ABSTRACT

A sterile cover for a touchscreen device is provided that includes a transparent, electrically conductive screen area adapted to cover a screen of the touchscreen device and including a first sterile material. The sterile cover also includes a perimeter area surrounding the screen region and having an opening adapted to receive the touchscreen device and including a second sterile material. A removable sterile cover for substantially encapsulating a touchscreen device is provided that includes an opening for inserting the touchscreen device into the cover and a closure for closing the opening. A device for dispensing sterile covers for touchscreen devices is provided that includes a chamber adapted to enclose a plurality of sterile covers and an actuator adapted to move a next sterile cover of into a ready position. The device also includes a loading area adapted to hold a touchscreen device.

21 Claims, 5 Drawing Sheets

(56) References Cited

OTHER PUBLICATIONS

Wodajo, Felasfa, "First Sterile iPad Sleeve for Operating Room," Medical Apps Forum, 2012, p. 1-5, http://www.imedicalapps.com/2012/03/sterile-ipad-sleeve-operating-room-exclusive-handson-review/.

* cited by examiner

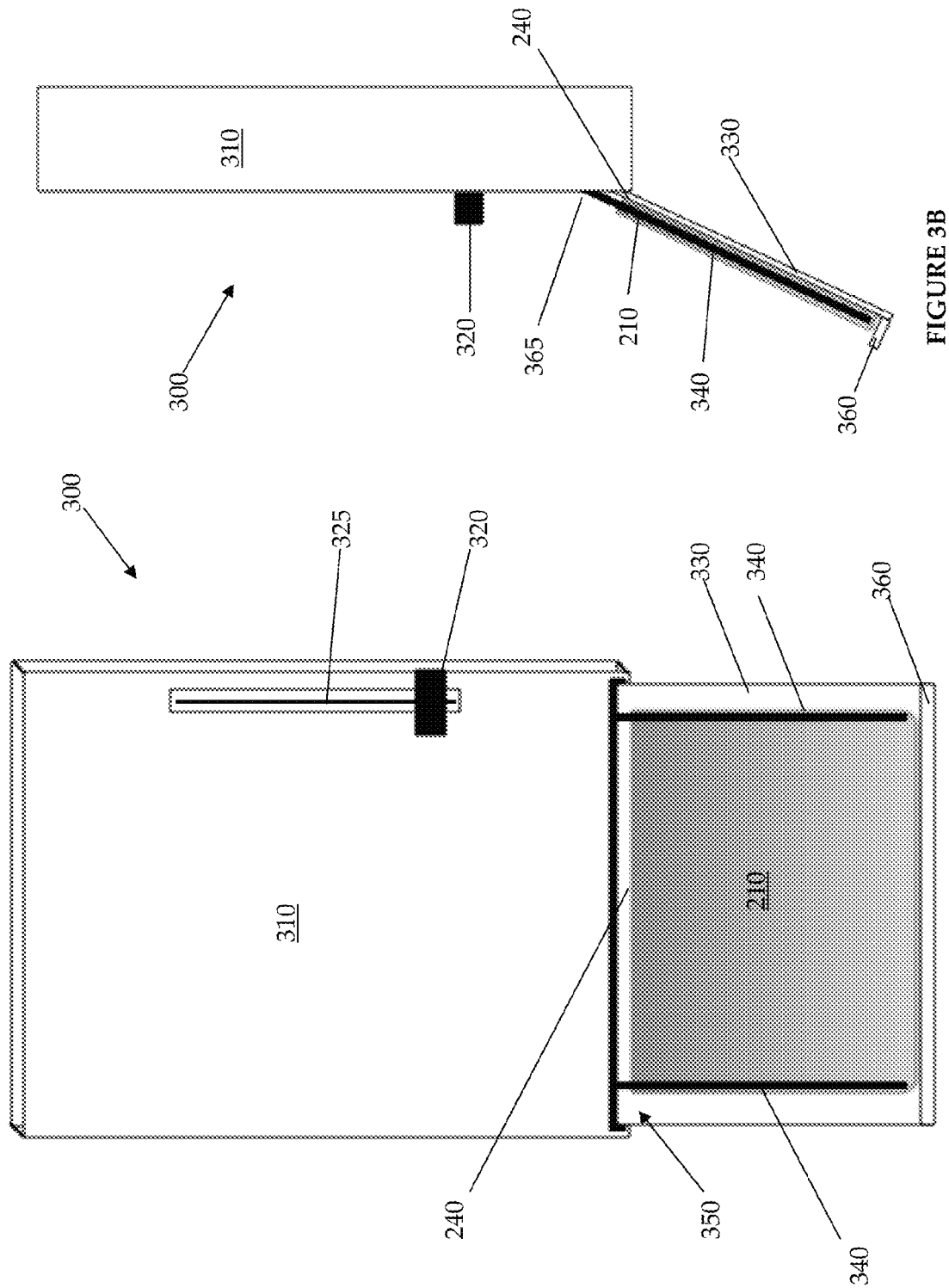

DEVICES AND DISPENSERS FOR STERILE COVERINGS FOR TABLET COMPUTERS AND MOBILE PHONES

CROSS REFERENCE

This application is a continuation of and claims priority benefit of U.S. patent application Ser. No. 13/358,484 filed Jan. 25, 2012 now abandoned, titled "Devices and Dispensers for Sterile Coverings for Tablet Computers and Mobile Phones," all of which is incorporated herein by reference.

FIELD OF THE INVENTION

The present invention relates generally to sterile coverings, and more specifically, to a sterile covering for a tablet computer and/or a smartphone.

BACKGROUND

Tablet computers and mobile phones, particularly smartphones, are growing in popularity. These devices are used in a wide variety of settings for personal pleasure and to increase productivity. One of the appeals of tablet computers and smartphones is ease of access due to the use of a touchscreen as an interface with the computer and/or the internet. Tablet computers and smartphones (hereinafter collectively referred to as touchscreen devices or display devices) can be used in a clinic, hospital or other care-giving environment by doctors, nurses, or other caregivers, as well as by patients and the family and friends of patients.

Hospitals, clinics and other care giving environments are subject to transmission of diseases through physical contact and via the air. Sterilization of objects that come into contact with patients, staff, and family are important, both before contact to protect the patient, and after contact to protect the general public. To date, the ability to sterilize a tablet computer or smartphone has been limited to alcohol swabbing or insertion into a sterile x-ray envelope. These solutions present significant drawbacks, including possible damage to the touchscreen device due to excessive alcohol usage, incomplete sterilization due to human error, inability to access the device due to a lack of electrical conductivity through the envelope material, and lack of ability to view the device through envelope material.

U.S. Patent Publication No. 2011/0256019 discusses technologies for providing sterilization of a touchscreen or other tactile input surface of a user input device. A self-sterilizing user input device includes a touchscreen for receiving tactile user input and an ultraviolet (UV) light source that emits UV light onto a touchscreen at a sterilization wavelength. A controller selectively activates and deactivates the UV light source according to whether a user is at or near the user input device. According to one aspect, the user input device includes a backlight to illuminate the touchscreen. The UV light source is positioned with the backlight to provide the UV light from a rear side of the touchscreen.

U.S. Patent Publication No. 2009/0021476 discusses a medical display system for performing a medical function, including: an image display unit configured for displaying a medical image data set, and an additional device, wherein the additional device is integrated with said image display unit and is configured to assist in performing the medical function of the medical display system.

U.S. Pat. No. 3,809,229 discusses an enclosure within which an elongated medical thermometer is to be placed prior to insertion into the body orifice of the subject whose temperature is to be taken. The enclosure may be secured to the thermometer at its heat sensitive portion. This enclosure will enable attainment of a level of asepsis presently obtainable only by discard of the thermometer itself after one-time use.

SUMMARY OF THE INVENTION

According to exemplary embodiments, the present invention provides for a tablet device (such as an Apple iPad tablet computer) to be modified by adding one or more disposable, or alternatively reusable, items that render the touchscreen device sterile. The invention herein is designed to cover tablet computers, or smartphones, to be used in clinical areas, for instance clinics, hospitals, emergency rooms, ambulances, etc., to help prevent the spread of infections from one patient to another.

A sterile cover for a touchscreen device is provided that includes a transparent, electrically conductive screen area adapted to cover a screen of the touchscreen device. The screen area includes a first sterile material. The sterile cover also includes a perimeter area surrounding the screen region and having an opening adapted to receive the touchscreen device. The perimeter area includes a second sterile material.

The sterile cover may be disposable, and the first sterile material may include polypropylene, low density polyethylene (LDPE), linear low density polyethylene (LLDPE), latex, vinyl, and/or nitrile. The sterile cover may be reusable by sterilizing at high temperature, and the first sterile material may include at least one of medical grade silicone and/or polypropylene.

The first and second sterile materials may be the same, and the first and/or the second sterile material may include an anti-bacterial coating.

The opening may be adapted to be closed by: an elastic material arranged around a mouth of the opening; an adhesive arranged on at least one of a tab and a flap adapted to cover the opening; a hook and loop fastener arranged on one of a tab and a flap adapted to cover the opening; a magnetic interaction between elements arranged on opposing sides of the opening; snaps; heat treatment; a ziptop, resealable arrangement arranged on opposing sides of the opening; and/or at least one of an element having shape memory at least one of embedded in the opening and coupled to the opening.

The opening may be adapted to couple to a system for removing air from inside the device prior to closing the opening in an airtight manner.

A removable sterile cover for substantially encapsulating a touchscreen device is provided. The removable sterile cover includes an opening for inserting the touchscreen device into the cover, and a closure for closing the opening. The cover includes a transparent area adapted to substantially cover the display of the touchscreen device. The transparent area is adapted to allow for normal operation of the touchscreen device by a user through the cover.

The removable sterile cover may include a fastener for securing the cover to the touchscreen device. The transparent area may be photosensitive, malleable, and/or electrically conductive. The cover may be re-sterilized after being used by at least one of boiling and autoclaving. The cover may be reused with a touchscreen device after being re-sterilized.

A device for dispensing sterile covers for touchscreen devices is provided that includes a chamber adapted to enclose a plurality of the sterile covers, and an actuator adapted to move a next sterile cover of the sterile covers into a ready position. The device also includes a loading area adapted to hold a touchscreen device during at least part of a covering operation that includes inserting the touchscreen device into the next sterile cover in the ready position.

The device may include an arrangement for removing air from the next sterile cover in the ready position after the touchscreen device has been inserted into the next sterile cover and before sealing the next sterile cover.

The device may include an arrangement for melting closed an opening of the next sterile cover to form an airtight seal of the next sterile cover. The chamber may be further adapted to be opened and receive a further plurality of the sterile covers.

The actuator may include a lever adapted to be actuated by a user, and a positioning arrangement coupled to the lever and adapted to position the next sterile cover in the ready position.

The positioning arrangement may be further adapted to hold an opening of the next sterile cover in an open position when the next sterile cover is positioned in the ready position.

The positioning arrangement may include at least two semi-rigid arms arranged on opposing sides of the device and adapted to be inserted into an interior of the next sterile cover through the opening and engage opposing interior sides of the next sterile cover.

The at least two semi-rigid arms may be spaced apart from each other by a distance equal to or greater than a width of the touchscreen device.

The loading area may include a hinged tray having a retaining lip on a lower edge. The hinged tray may provide a first surface for a back of the touchscreen device to contact after insertion of the touchscreen device into the next sterile cover. The retaining lip may provide a second surface for a bottom of the touchscreen device to contact after insertion of the touchscreen device into the next sterile cover.

These and other advantages of the present invention will be apparent when reference is made to the accompanying drawings and the following description.

BRIEF DESCRIPTION OF THE DRAWINGS

FIG. 3A is a front view of a dispenser of sterile covers for tablet-style personal computers or mobile phones according to the present invention;

FIG. 3B is a side view of a dispenser of sterile covers for tablet-style personal computers or mobile phones according to the present invention;

DETAILED DESCRIPTION OF EXEMPLARY EMBODIMENTS

Figure 1A:
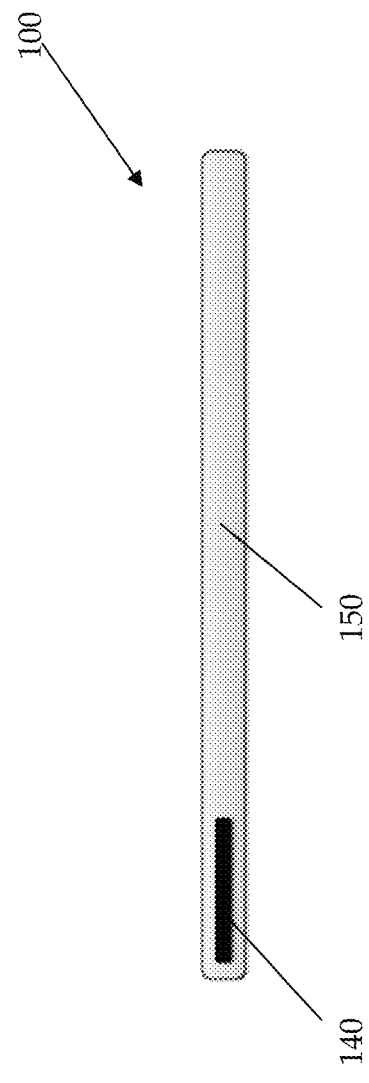
FIG. 1A is a front view of a tablet-style personal computer or mobile phone.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated. According to exemplary embodiments, the present technology relates generally to sterile coverings. More specifically, the present invention provides a sterile covering for a tablet computer or a smartphone. Additionally, the present invention provides a dispenser for a sterile covering for a touchscreen device.

An enclosure is provided within which a tablet style personal computer or mobile phone may be placed prior to visitation or contact with a medical patient. The enclosure may be secured to the tablet style personal computer at the screen or at any of the human interface components. This sterile covering may enable a level of asepsis higher than anything other than using a new touchscreen device for each patient interaction.

A disposable sterile tablet-style computer and mobile phone case is provided. This invention consists of an enclosure to receive a tablet-style personal computer or mobile phone prior to use and from which it is to be removed after use. After each use the enclosure is to be either discarded, if of the disposable type (also referred to herein and generally as "throw-away"), or stored for sterilization, if of the re-usable type. Since either type will provide optimum sanitary conditions during the use of tablet-style personal computers or mobile phones, the invention will tend to greatly reduce the hazards of transferring infection from one medical patient to another.

The enclosure (also referred to herein as a covering, sterile covering, sleeve, or sterile sleeve) may possess the necessary electrically conductive, photosensitive or malleable properties (depending on the intended use of the human interface components of the enclosed device) to allow for normal operation of the electronic device without significant interference from the enclosure. The object of the invention is to provide optimum asepsis during the use of tablet-style personal computers or mobile phones in healthcare environments and/or biology laboratories. These tablet-style personal computers or mobile phones may not be able to function after an accepted first level of sterilizing procedures, for example boiling, much less the even higher temperatures and conditions of a preferred sterilization method, namely, autoclaving. This inability to sterilize a tablet-style personal computer and/or mobile phone presents a hazard and a deterrent for the use of a touchscreen device in the field of healthcare.

The present invention achieves the desired objective by providing a removable, replaceable outer layer to tablet-style personal computers and mobile phones. This layer may be sterile, and may be disposable or able to be re-sterilized. In particular, the invention is suitable to two principal modes of construction. One mode is for the enclosure to be constructed of materials sufficiently durable to withstand approved sterilization techniques, for instance boiling in water and/or autoclaving. An enclosure made according to this mode is intended for re-use. The second mode is for the enclosure to be manufactured and packaged such that the necessary asepsis is maintained until the first use only. An enclosure made according to this mode is intended to be discarded after the first use, and may therefore be referred to as a "disposable" or "throw-away" model.

In some exemplary embodiments, the display device may be enclosed in more than one sterile cover, and after contact with each patient or when desired, the outermost sterile cover may be removed leaving a next inner sterile cover. The next inner sterile cover provides a sterile cover that allows exposure to a new patient without fear of contamination.

Various techniques, configurations, materials and modifications may be suitable to construction of an exemplary embodiment. For example, in both the reusable and disposable versions, a portion of the enclosure overlaying the display interface and/or the human interface component(s) (for example, buttons) of the tablet-style personal computer or mobile phone may be transparent, electrically conductive, photosensitive and potentially malleable, such that the device may be operational without removal of the enclosure. Further, the enclosure can also be made to receive a variety of caps, extensions or self-enclosures. Presence or absence of a closure may not be essential to the objective of the sterile cover, namely the sterile use of the touchscreen device.

FIG. 1A is a front view of touchscreen device 100, which may be a tablet-style personal computer or mobile phone. Touchscreen device 100 includes front face 130, which includes touchscreen 110 and button 120. In alternative exemplary embodiments, touchscreen 110 may not be a touchscreen, may be a touchscreen activated by a special pen or stylus, or may be a tablet device having a screen and activated by voice or manual buttons. In still further alternative exemplary embodiments, button 120 may be a plurality of buttons, which may be positioned on front face 130, side or top edges of touchscreen device 100, and/or a back face of touchscreen 100. Front face 130 may be made of a transparent (and in touch-sensitive displays, electro-sensitive, at least in an area of touchscreen 110) material such as glass. There may be one or more buttons 120, which may provide a physically "clickable" human interface component, which may function as a special activator of the software in touchscreen device 100, for instance as a "home" key, and which may react to a physical depression of the button 120.

Figure 1B:
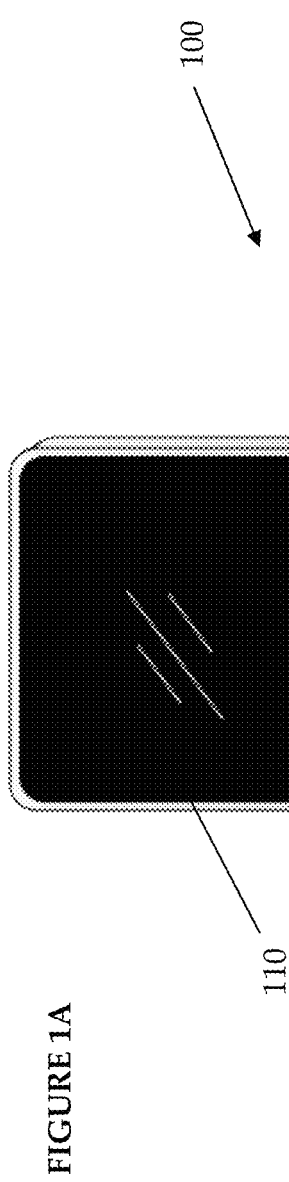
FIG. 1B is a side view of a tablet-style personal computer or mobile phone.

FIG. 1B is a side view of touchscreen device 100. Side edge 150 of touchscreen device 100 may include bi-level button 140, which may function as a volume control. Alternatively, more or fewer buttons may be provided on side edge 150. Additionally, side edge 150 may include ports for coupling external devices to touchscreen device 100, including for example a USB port and/or a charging plug.

Figure 2A:
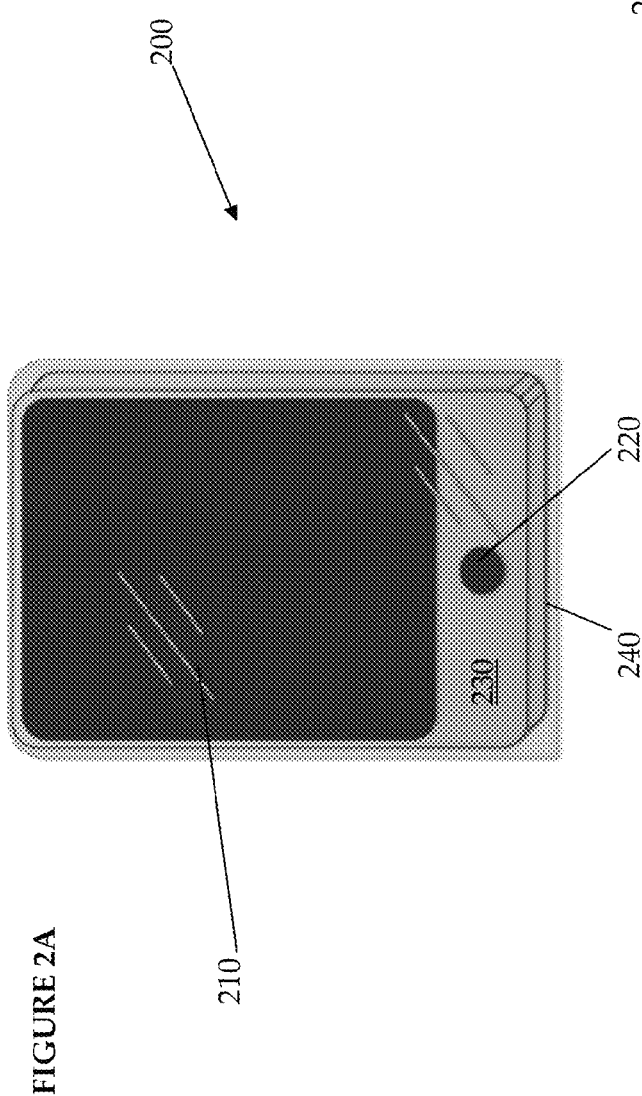
FIG. 2A is a front view of a tablet-style personal computer or mobile phone enclosed in a sterile cover according to the present invention.

FIG. 2A is a front view of a touchscreen device enclosed in sterile cover 200 according to the present invention. Sterile cover 200 may include touchscreen area 210, which may be transparent and electrically conductive to allow operation of the touchscreen of the touchscreen device. Sterile cover 200 may also include non-electrically conductive area 230, which may not allow operation of a touchscreen, and which therefore may be positioned away from a touchscreen or alternatively on a tablet computer or smart phone that does not utilize a touchscreen, or in the case that the user is willing to forgo use of the touchscreen when working in the sterile environment. Sterile cover 200 may include malleable regions 220 that allow operation of a button on the touchscreen device through sterile cover 200. Sterile cover 200 may include opening 240 for insertion of the touchscreen device. Opening 240 may be positioned to be adjacent to a bottom edge of the touchscreen device when the touchscreen device is inserted into sterile cover 200.

Figure 2B:
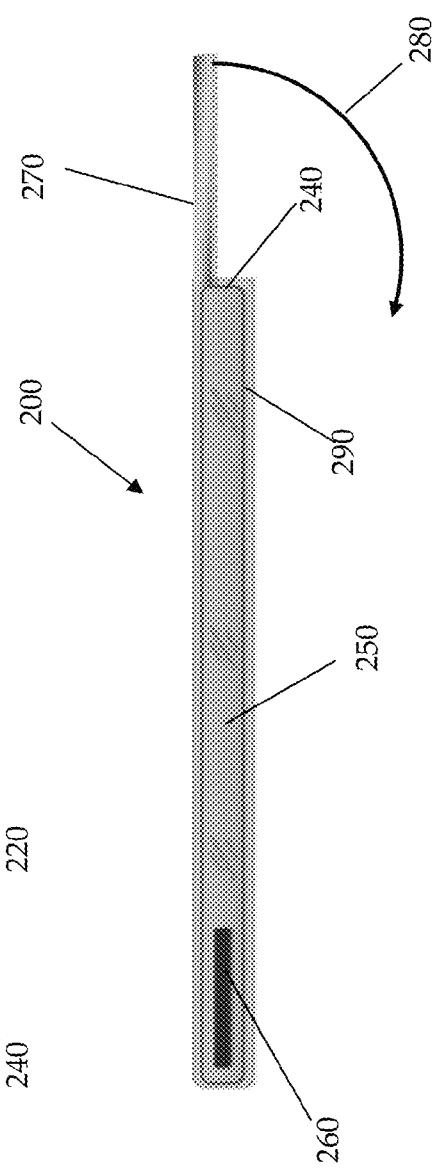
FIG. 2B is a side view of a tablet-style personal computer or mobile phone enclosed in a sterile cover according to the present invention.

FIG. 2B is a side view of a tablet-style personal computer or mobile phone enclosed in sterile cover 200 according to the present invention. Sterile cover 200 includes opening 240 arranged on a bottom edge of the touchscreen device. In FIG. 2B, opening 240 of sterile cover 200 is open, and specifically, flap 270 of sterile cover 200 is extended. After inserting the touchscreen device into sterile cover 200, flap 270 may be rotated in the direction of arrow 280 to contact back area 290 of sterile cover 200. Flap 270 and/or back area 290 may include a self-adhesive, a two-part adhesive, a hook-and-loop fastener arrangement, snaps, or any other appropriate closure mechanism. Sterile cover 200 may include malleable area 260 on side 250 to allow manipulation of control buttons by a user when sterile cover 200 is on the touchscreen device.

In accordance with the present invention, there is provided a prophylactic enclosure or sleeve adapted to receive the tablet-style personal computer or mobile phone. The sleeve includes electrically conductive, photosensitive or malleable properties (depending on the intended use of the human interface components of the enclosed device), which may be, for example plastic or some other synthetic material that meets the above criteria. The sleeve enables full operation of the touchscreen device while being open-ended in form. Other iterations of the sleeve may be designed to fully enclose the present invention. The present invention is adapted to work with any tablet-style personal computer or mobile phone, and may be manufactured in a variety of shapes and sizes to conform to the sizes and shapes of the products available to businesses and consumers.

In use, only the sleeve will become contaminated and, depending on the intended use of the sleeve, the sleeve will either be discarded after use with a patient, or will be placed in a receptacle used to collect contaminated sleeves that will eventually be sterilized and re-used. Transfer of infection or any contamination on one tablet-style personal computer or mobile phone that is used with or around patients may largely be precluded by disposal or removal of the sterile sleeve between patients. As mentioned, the sleeve may be disposable or re-sterilized and re-used.

A prophylactic enclosure (or "sleeve") for a tablet-style personal computer or mobile phone is provided that possesses the necessary electrically conductive, photosensitive or malleable properties (depending on the intended use of the human interface components of the enclosed device) to allow for normal operation of the electronic device without significant interference from the enclosure.

The following closure methods and systems may be used with the present device: a method that utilizes a self-adhesive flap (similar to an envelope); a method that utilizes two opposite grooves that are physically pressed to snap shut (similar to a "Ziploc" closure); a method that has two tongue-in-groove snaps (one on each side, in localized areas) that clip together to form a seal; and a method that utilizes a coated aluminum strip which has two flaps, one on each end (similar to the closure method of a personal hygiene bag found in the seat pocket of a commercial airplane) that can be conformed to the edges of the tablet to form a seal, for instance as used to close a coffee bag.

Additional alternative closure methods include utilizing a heat-treatment to seal the sleeve, and/or utilizing a chemical seal that is activated when the two opposing sides contact each other (also referred to herein as a two-part adhesive) that utilizes two compounds together to form an adhesive, for instance an epoxy compound. In the case of the two-part adhesive, both sides could be inside the sleeve which may then be merely pinched together, or one part could be inside and the other part outside using the envelope method. This is in contrast to the self-adhesive method in which only one side of the flap or inside surface is coated with the self-adhesive. Other alternatives include a closure method that utilizes the "clingy" properties of low density polyethylene (LDPE); a closure method that utilizes two oppositely-charged magnetic strips which cling together to form a seal; a closure method that utilizes multiple oppositely-charged magnets which cling together to form a seal; and a closure method that utilizes multiple snaps that can be pressed together to form a seal. A further alternative includes a closure method that utilizes two groves that are secured together using a sliding mechanism, which may also be referred to as a Ziploc with a zipper.

Any of the above closure methods that form an airtight seal, for example by melting with heat, may also be utilized in conjunction with a machine that sucks the air out of the sleeve just prior to the sealing operation.

As mentioned earlier, the present invention may be used in conjunction with a tablet or smartphone that does not have a touch-sensitive touchscreen, and/or may be used with a touchscreen device without utilizing the touchscreen. In particular, a sterile cover according to the present invention may not be electrically conductive, and may allow control of the tablet or smartphone via an audio input, by for example voice commands. In other alternatives, the tablet or smartphone may be controlled by mechanical buttons on the face, side or back of the tablet or smartphone. In these cases, the sterile cover may be malleable, and will be transparent in a display area of the tablet or smartphone, but may or may not have an electrically conductive area over the screen.

For a disposable sleeve, any one or more of the following materials may be used: polypropylene; polyvinyl chloride (PVC); low density polyethylene (LDPE); and linear low density polyethylene (LLDPE). The electrical conductivity of these materials may depend on the thickness of the material used on the face of the touchscreen.

For a reusable sleeve, any one or more of the following materials may be used: medical grade silicone (that may conform with USP Class VI requirement and/or FDA 21 CFR 177.2600); food grade silicone; high temperature styrene acrylonitrile (SAN), copolymerized with either alpha methyl styrene or N-phenyl maleimide to increase the heat deflection temperature; styrene maelic anhydride (SMA); and polycarbonate.

A further list of possible materials for use in sleeves, and in particular for use in the touchscreen region for use with a touchscreen device, and having enough electrically-conductive properties to operate most electronic touch-screen devices includes, for disposable sleeves: polypropylene; low density polyethylene (LDPE); linear low density polyethylene (LLDPE); latex; vinyl; and nitrile. Likewise, materials for use in the touchscreen region of a sterile cover may be selected from the following: medical grade silicone, and polypropylene.

A special dispenser that allows one to place the tablet (or a mobile phone) inside the sleeve easily is provided. The dispenser may load the next sleeve as the current sleeve is removed or upon pulling a lever after the current sleeve is removed. The dispenser is designed to allow someone to place a tablet (or mobile phone) inside a disposable sterile sleeve easily, and then to load the next sleeve once the current sleeve is removed and a lever is pulled. A dispenser enclosure stores unused sleeves inside ready for use.

In one exemplary embodiment, the dispenser includes a lever which retracts and extends the two telescopic arms that bring the next sleeve out, stretching it open for easy insertion of the tablet into the sleeve. The lever is pulled from the top position to the bottom position. One of the telescopic arms fetches the new sleeve and stretches it open for tablet insertion. Therefore a new sleeve is waiting for a tablet to be inserted.

A tray may be provided that ensures that the tablet is stable for insertion into the sleeve. A pivoting hinge may be provided for the tray to make it easier to insert the tablet. The tray may have a lip designed to ensure that the tablet does not fall after it has been inserted into the sleeve.

FIG. 3A is a front view of dispenser 300, which dispenses sterile covers for tablet-style personal computers or mobile phones, according to the present invention. Dispenser 300 includes case 310 that encloses the sterile covers prior to dispensing them. Case 310 may be opened and refilled to resupply sterile covers to dispenser 300. Case 310 may be mounted on a wall or in any other appropriate place. Case 310 includes lever 320, which may be pulled down slot 325 to position sterile cover 200 in a ready position. Sterile cover 200 may come out opening 350 when lever 320 is pulled with the assistance of two arms 340 inserted into an interior of sterile cover 200. Arms 340 may position sterile cover 200 on tray 330 above lip 360 when lever 320 is pulled. When sterile cover 200 is in a ready position, opening 240 of sterile cover 200 may be accessible by a user for insertion of a touchscreen device into sterile cover 200.

FIG. 3B is a side view of a dispenser 300. Dispenser 300 includes case 310 that encloses the sterile covers prior to dispensing them. Case 310 includes lever 320, which may be pulled down to position sterile cover 200 in a ready position. Sterile cover 200 may come out an opening when lever 320 is pulled with the assistance of arms 340 inserted into an interior of sterile cover 200. Arms 340 may position sterile cover 200 on tray 330 above lip 360 when lever 320 is pulled. When sterile cover 200 is in a ready position, opening 240 of sterile cover 200 may be accessible by a user for insertion of a touchscreen device into sterile cover 200. Arms 340 and tray 330 may pivot at hinge 365 to assist a user in inserting a touchscreen device into sterile cover 200 by creating a stable platform to hold the touchscreen device on tray 330 resting against lip 360. Hinge 365 may operate mechanically to automatically project out from a front surface of case 310 as shown in FIG. 3B, without additional input or action by a user. Alternatively, hinge 365 may be free floating and operable by a user, and/or may hold any angle at which it is positioned.

Figure 3C:
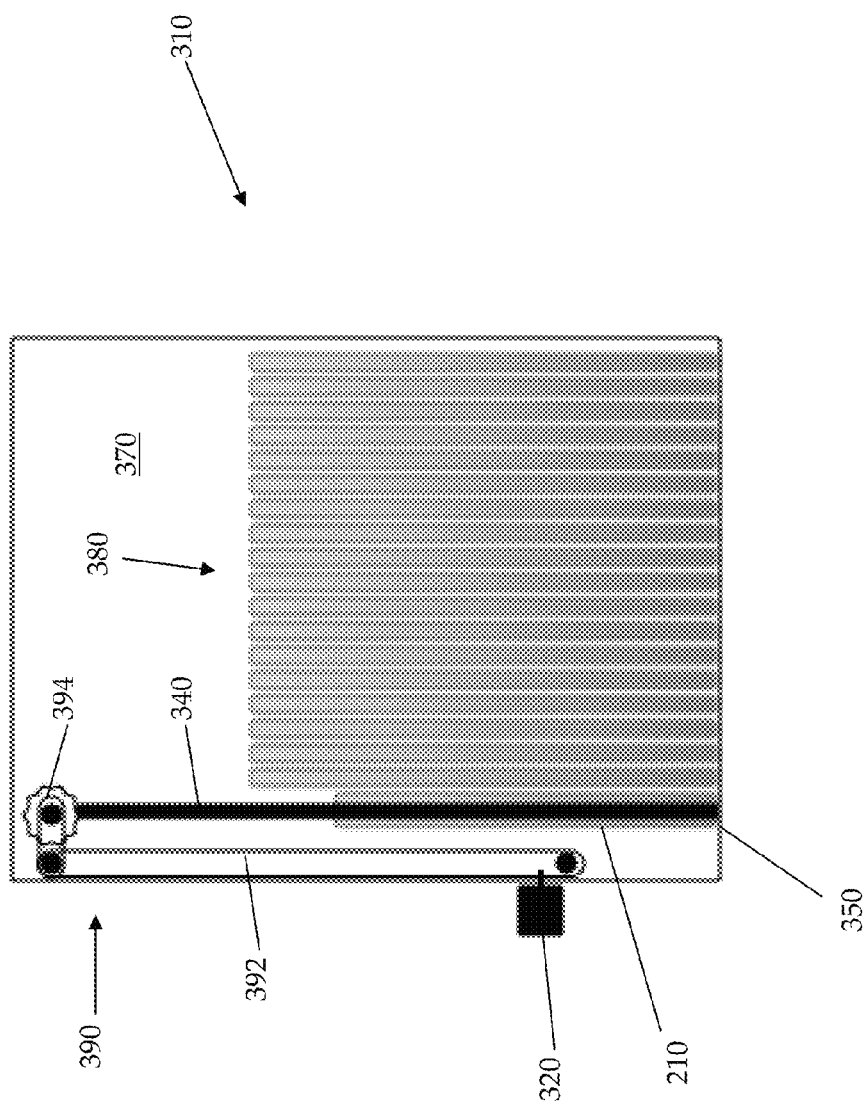
FIG. 3C is a schematic side view of an interior of a dispenser of sterile covers for tablet-style personal computers or mobile phones according to the present invention.

FIG. 3C is a schematic side view of interior 370 of case 310 of a dispenser of sterile covers for tablet-style personal computers or mobile phones according to the present invention. Interior 370 provides an area for storage of stack 380 of sterile covers, which may include any number of sterile covers prior to dispensing. A surface backed by a spring may contact stack 380 to ensure that the stack is moved toward dispensing system 390 area after dispensing a sterile cover to ensure that all of the sterile covers in stack 380 are used. Dispensing system 390 is coupled to lever 320 to allow operation by a user. When a user pulls lever 320 down to initiate dispensing of sterile cover 200, the tension on cable 392 is reduced. Cable 392 may be made of wire, rope, or any other appropriate material. Cable 392 loops over gear 394 at a top area of interior 370. Gear 394 may be biased to rotate clockwise absent sufficient tension from cable 392. Therefore, when the tension on cable 392 is reduced by the lowering of lever 320, gear 394 rotates clockwise, causing arms 340 to lower.

Additional elements may be used to control the movement of arms 340, for instance rollers arranged around opening 350 biased to push arms 340 out opening 350 and control the direction of movement of arms 340. Arms 340 may return to interior 370 by a manual movement of lever 320 or automatically upon release of lever 320 or upon sensing of removal of sterile cover 200, after insertion of a touchscreen device into sterile cover 200. FIG. 3C is schematic and not to scale, and the return of arms 340 into interior 370 may be to a point above stack 380 to allow the insertion of arms 340 into the next sterile cover of stack 380. Arms 340 may be coupled to an air pump and may be hollow to allow removal of air from sterile cover 200 after insertion of a touchscreen device prior to airtight sealing of sterile cover 200. Airtight sealing of sterile cover 200 may be achieved by two linear heating elements arranged at opening 350 operable to move together sandwiching open material of sterile cover 200 and to melt the material together.

Figure 4:
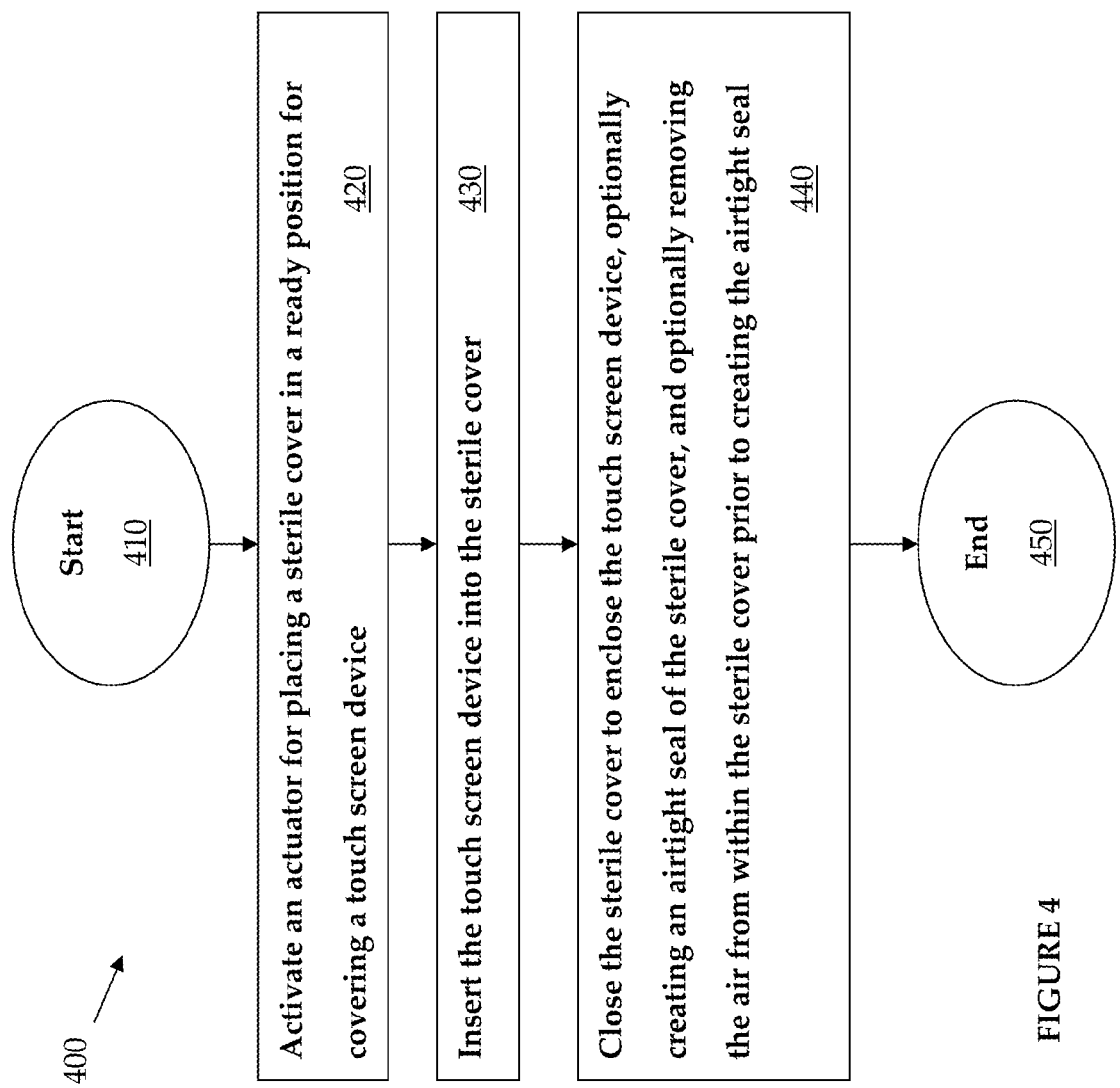
FIG. 4 is a flow chart illustrating an exemplary method according to the present technology.

FIG. 4 illustrates method 400 according to the present technology. Method 400 starts at start oval 410 and proceeds to operation 420, which indicates to activate an actuator for placing a sterile cover in a ready position for covering a touchscreen device. From operation 420, the flow proceeds to operation 430, which indicates to insert the touchscreen device into the sterile cover. From operation 430, the flow proceeds to operation 440, which indicates to close the sterile cover to enclose the touchscreen device. Operation 440 additionally indicates that an airtight seal of the sterile cover may optionally be created. In a further optional process in operation 440, the air from within the sterile cover may be removed prior to creating the airtight seal. From operation 440, the flow proceeds to end oval 450.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A sterile cover for a touchscreen device, comprising:
    a transparent, electrically conductive screen area adapted to cover a screen of the touchscreen device, the electrically conductive screen area comprising a first sterile material; and
    a perimeter area surrounding the electrically conductive screen area and having an opening adapted to receive the touchscreen device, the perimeter area comprising a second sterile material, the opening including a hook and loop fastener arranged on a flap adapted to cover the opening.

2. The sterile cover of claim 1, wherein the first sterile material comprises at least latex.

3. The sterile cover of claim 1, wherein the sterile cover is reusable by sterilizing at high temperature.

4. The sterile cover of claim 3, wherein the first sterile material comprises medical grade silicone.

5. The sterile cover of claim 1, wherein the first and second sterile materials are the same.

6. The sterile cover of claim 1, wherein at least one of the first and second sterile materials comprises an anti-bacterial coating.

7. The sterile cover of claim 1, wherein the opening is adapted to be further closed by at least one of:
    an elastic material arranged around a mouth of the opening;
    heat treatment;
    a ziptop, resealable arrangement arranged on opposing sides of the opening; and
    at least one of an element having shape memory and at least one of embedded in the opening and coupled to the opening.

8. The sterile cover of claim 1, wherein the opening is adapted to couple to a system for removing air from inside the touchscreen device prior to closing the opening in an airtight manner.

9. The sterile cover of claim 1, wherein the flap extends from an edge of the opening.

10. The sterile cover of claim 1, wherein the opening is adapted to be further closed by a magnetic interaction between elements arranged on opposing sides of the opening.

11. The sterile cover of claim 1, wherein the first sterile material comprises vinyl.

12. The sterile cover of claim 1, wherein the first sterile material comprises nitrile.

13. A removable sterile cover for substantially encapsulating a display device, comprising:
    an opening for inserting the display device into the cover; and
    a closure for closing the opening;
    wherein the cover includes a transparent area adapted to substantially cover a display of the display device;
    wherein the transparent area is electrically conductive, and is adapted to allow for normal operation of the display device by a user through the cover; and
    wherein the opening is adapted to be closed by a magnetic interaction between elements arranged on opposing sides of the opening.

14. The removable sterile cover according to claim 13, further comprising a fastener for securing the cover to the display device.

15. The removable sterile cover according to claim 13, wherein the display device is a touchscreen device.

16. The removable sterile cover according to claim 13, wherein:
    the cover is adapted to be re-sterilized after being used by at least one of boiling and autoclaving; and
    the cover is adapted to be reused with a touchscreen device after being re-sterilized.

17. The removable sterile cover according to claim 13, wherein the opening includes a hook and loop fastener arranged on a flap adapted to cover the opening.

18. The removable sterile cover according to claim 17, wherein the flap extends from an edge of the opening.

19. The removable sterile cover according to claim 13, wherein the removable sterile cover comprises vinyl.

20. The removable sterile cover according to claim 13, wherein the removable sterile cover comprises latex.

21. The removable sterile cover according to claim 13, wherein the removable sterile cover comprises nitrile.

* * * * *